(12) United States Patent
Terada et al.

(10) Patent No.: US 10,713,807 B2
(45) Date of Patent: Jul. 14, 2020

(54) VICINITY SUPERVISING DEVICE AND VICINITY SUPERVISING METHOD OF VEHICLE

(71) Applicants: DENSO CORPORATION, Kariya, Aichi-pref. (JP); TOYOTA JIDOSHA KABUSHIKI KAISHA, Toyota-shi, Aichi-ken (JP); RICOH COMPANY, LTD., Tokyo (JP)

(72) Inventors: Toshihiko Terada, Kariya (JP); Hiroaki Ito, Toyota (JP); Naohide Uchida, Numazu (JP); Kagehiro Nagao, Tokyo (JP)

(73) Assignees: DENSO CORPORATION, Kariya, Aichi-Pref. (JP); TOYOTA JIDOSHA KABUSHIKI KAISHA, Toyota-Shi, Aichi-Ken (JP); RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/145,872

(22) Filed: Sep. 28, 2018

(65) Prior Publication Data

US 2019/0102901 A1 Apr. 4, 2019

(30) Foreign Application Priority Data

Sep. 29, 2017 (JP) .................................. 2017-192064

(51) Int. Cl.
*G06T 7/593* (2017.01)
*G06K 9/62* (2006.01)
(Continued)

(52) U.S. Cl.
CPC .............. *G06T 7/593* (2017.01); *G01C 3/085* (2013.01); *G06K 9/00805* (2013.01);
(Continued)

(58) Field of Classification Search
CPC .. G06T 7/593; G06T 7/70; G06T 7/85; G06T 2207/0021; G06T 2207/30252;
(Continued)

(56) References Cited

U.S. PATENT DOCUMENTS 8,139,821 B2 * 3/2012 Aimura .................. G01C 3/085
382/104
8,488,872 B2 * 7/2013 Tsurube ................. G01C 3/085
382/154
(Continued)

FOREIGN PATENT DOCUMENTS

JP 5280768 B2 9/2013

*Primary Examiner* — Brian P Yenke
(74) *Attorney, Agent, or Firm* — Maschoff Brennan

(57) ABSTRACT

A vicinity supervising device of a vehicle includes an image capturing unit capturing a plurality of images at different locations; a distance acquiring unit acquiring a distance up to the object detected by transmitting and receiving probing waves from/to the object; a first offset calculation unit calculating a first parallax offset value based on the plurality of images and the distance up to the object; and a second offset calculation unit calculating a second parallax offset value based on a change in a parallax in a predetermined period at an identical point among the plurality of images and a travel distance of the vehicle travelling in a predetermined period; and a parallax correction unit correcting the parallax using the first parallax offset value under a condition where a difference between the first parallax offset value and the second parallax offset value is less than or equal to a threshold.

6 Claims, 5 Drawing Sheets

(51) Int. Cl.
*H04N 13/128* (2018.01)
*G01C 3/08* (2006.01)
*G06T 7/70* (2017.01)
*H04N 13/254* (2018.01)
*G06K 9/00* (2006.01)
*H04N 13/243* (2018.01)
*H04N 13/271* (2018.01)
*H04N 13/239* (2018.01)
*B60R 1/00* (2006.01)
*H04N 13/00* (2018.01)

(52) U.S. Cl.
CPC .............. *G06K 9/6202* (2013.01); *G06T 7/70* (2017.01); *H04N 13/128* (2018.05); *H04N 13/243* (2018.05); *H04N 13/254* (2018.05); *H04N 13/271* (2018.05); *B60R 1/00* (2013.01); *B60R 2300/107* (2013.01); *B60R 2300/30* (2013.01); *G06T 2207/10012* (2013.01); *G06T 2207/10028* (2013.01); *G06T 2207/30252* (2013.01); *H04N 13/239* (2018.05); *H04N 2013/0081* (2013.01)

(58) Field of Classification Search
CPC .. H04N 13/128; H04N 13/254; H04N 13/271; H04N 13/243; G01C 3/08; B60R 2300/107; B60R 2300/30
See application file for complete search history.

(56) References Cited

U.S. PATENT DOCUMENTS

| | | | | |
|---|---|---|---|---|
| 8,878,915 | B2 * | 11/2014 | Morisada | G06T 7/97 348/54 |
| 8,923,560 | B2 * | 12/2014 | Saito | G06K 9/00791 382/103 |
| 9,148,657 | B2 * | 9/2015 | Aoki | G06T 7/85 |
| 9,170,103 | B2 * | 10/2015 | Umezawa | G01C 3/085 |
| 9,886,649 | B2 * | 2/2018 | Kakegawa | G08G 1/165 |
| 10,007,998 | B2 * | 6/2018 | Nomura | G06T 7/20 |
| 10,085,001 | B2 * | 9/2018 | Shoji | G06T 7/80 |
| 10,186,034 | B2 * | 1/2019 | Kikuchi | G06T 3/4038 |
| 10,247,551 | B2 * | 4/2019 | Kido | G06T 7/74 |
| 10,313,658 | B2 * | 6/2019 | Yatsuri | B60R 1/00 |
| 2001/0002936 | A1 * | 6/2001 | Tsuji | G06K 9/6203 382/170 |
| 2003/0169918 | A1 * | 9/2003 | Sogawa | G06T 5/006 382/154 |
| 2006/0114320 | A1 * | 6/2006 | Nagaoka | G06T 7/85 348/118 |
| 2007/0165910 | A1 * | 7/2007 | Nagaoka | B60W 40/04 382/104 |
| 2009/0046924 | A1 * | 2/2009 | Morimitsu | G01C 11/06 382/154 |
| 2010/0156616 | A1 * | 6/2010 | Aimura | G06K 9/00805 340/436 |
| 2010/0278392 | A1 * | 11/2010 | Nagaoka | B60R 1/00 382/106 |
| 2011/0170748 | A1 * | 7/2011 | Aimura | G01C 3/085 382/106 |
| 2012/0041617 | A1 * | 2/2012 | Aimura | G06K 9/00805 701/1 |
| 2012/0224069 | A1 * | 9/2012 | Aoki | G01B 11/026 348/187 |
| 2012/0236125 | A1 * | 9/2012 | Umezawa | G01C 3/085 348/47 |
| 2013/0250065 | A1 * | 9/2013 | Aoki | G06K 9/00791 348/46 |
| 2013/0250068 | A1 * | 9/2013 | Aoki | G06T 7/85 348/47 |
| 2014/0168377 | A1 * | 6/2014 | Cluff | H04N 13/246 348/47 |
| 2014/0300704 | A1 * | 10/2014 | Ramaswamy | G06T 7/85 348/48 |
| 2018/0143315 | A1 * | 5/2018 | Shirai | G06T 7/593 |
| 2019/0095761 | A1 * | 3/2019 | Terada | G06K 9/00791 |
| 2019/0096075 | A1 * | 3/2019 | Terada | G06T 7/593 |
| 2019/0102642 | A1 * | 4/2019 | Tanabe | G06K 9/2054 |
| 2019/0102869 | A1 * | 4/2019 | Terada | G06T 5/006 |
| 2019/0102898 | A1 * | 4/2019 | Tanabe | G06T 7/593 |
| 2019/0102900 | A1 * | 4/2019 | Uchida | G06T 7/593 |
| 2019/0102912 | A1 * | 4/2019 | Terada | G06T 7/85 |

* cited by examiner

PIXEL REGION PBo

| 1 | 2 | 3 |
|---|---|---|
| 4 | 5 | 6 |
| 7 | 8 | 9 |

PIXEL REGION PBc

| 1 | 2 | 3 |
|---|---|---|
| 4 | 5 | 6 |
| 7 | 8 | 9 |

TIME t0

TIME t1

VICINITY SUPERVISING DEVICE AND VICINITY SUPERVISING METHOD OF VEHICLE

CROSS-REFERENCE TO RELATED APPLICATION

This application is based on and claims the benefit of priority from earlier Japanese Patent Application No. 2017-192064 filed Sep. 29, 2017, the description of which is incorporated herein by reference.

BACKGROUND

Technical Field

The present disclosure relates to a vicinity supervising device and a vicinity supervising method which supervise vicinity of a vehicle by using a plurality of images in which an object is captured at different locations.

Description of the Related Art

Conventionally, a vehicle supervising device that supervises a vicinity of a vehicle is known. The vehicle supervising device acquires a plurality of images in which an object in the vicinity of the vehicle is simultaneously captured at different locations using an imaging device such as a stereo camera. In the vehicle supervising device, a parallax is calculated from the plurality of images to detect a position of the object, thereby supervising a vicinity of the vehicle.

In the case where optical axes of two cameras in the stereo camera are displaced, a parallax calculated from the captured image may have an error (i.e., parallax offset). The parallax offset may cause a detection error of the position of the object. In this respect, for example, Japanese Patent Number 5280768 discloses a technique in which a parallax offset is calculated and the parallax value is corrected by using the calculated parallax offset.

According to the above-mentioned patent literature JP-5280768, a difference between a parallax value calculated on the basis of a distance to an object detected by a radar apparatus, a baseline length and a focus distance of a stereo camera, and a parallax value calculated by performing a stereo matching for two images captured by the stereo camera is calculated, thereby acquiring a parallax offset. According to this method of calculating the parallax offset, the parallax offset can be calculated with relatively high accuracy. However, in the case where significant error has occurred, because of abnormalities of a radar apparatus, in a detection value of the distance up to the object or the calculated parallax, since the calculated parallax offset value has an error, accurate parallax correction is difficult to achieve. As a result, malfunction of the vicinity supervising device occurs, which may cause inappropriate alert display or command to the vehicle control system.

SUMMARY

The present disclosure has been achieved in light of the above-described circumstances and provides a vicinity supervising device and a vicinity supervising method in which high parallax correction accuracy is secured and malfunction or failure is minimized.

The present disclosure provides a vicinity supervising device of a vehicle including an image capturing unit that captures a plurality of images in which an object is simultaneously captured at different locations; a distance acquiring unit that acquires a distance up to the object detected by transmitting and receiving probing waves from/to the object; a first offset calculation unit that calculates a first parallax offset value based on the plurality of images and the distance up to the object; and a second offset calculation unit that calculates a second parallax offset value based on a change in a parallax in a predetermined period at an identical point among the plurality of images acquired by the image capturing unit and a travel distance of the vehicle travelling in a predetermined period; and a parallax correction unit that corrects the parallax using the first parallax offset value under a condition where a difference between the first parallax offset value and the second parallax offset value is less than or equal to a threshold.

According to the present disclosure, the parallax is corrected using the first parallax offset value, when a difference between two parallax offset values which are calculated with two different calculation methods for the images captured by the image capturing unit, is equal to or less than a threshold. Accordingly, a parallax correction using a first offset value containing errors can be suppressed. As a result, a vicinity supervising device can be provided in which high parallax correction accuracy is secured and malfunction or failure is minimized.

Further, the present disclosure provides a vicinity supervising method which is executed by the above-described vicinity supervising device. The method includes an image capturing step of capturing a plurality of images in which an object is simultaneously captured at different locations; a distance acquiring step of acquiring a distance up to the object detected by transmitting and receiving probing waves from/to the object; a first offset calculation step of calculating a first parallax offset value based on the plurality of images and the distance up to the object; a second offset calculation step of calculating a second parallax offset value based on a change in a parallax in a predetermined period at an identical point among the plurality of images acquired in the image capturing step and a travel distance of the vehicle travelling in a predetermined period; and a parallax correction unit of correcting the parallax using the first parallax offset value under a condition where a difference between the first parallax offset value and the second parallax offset value is less than or equal to a threshold.

DETAILED DESCRIPTION OF THE PREFERRED EMBODIMENTS

Figure 1:
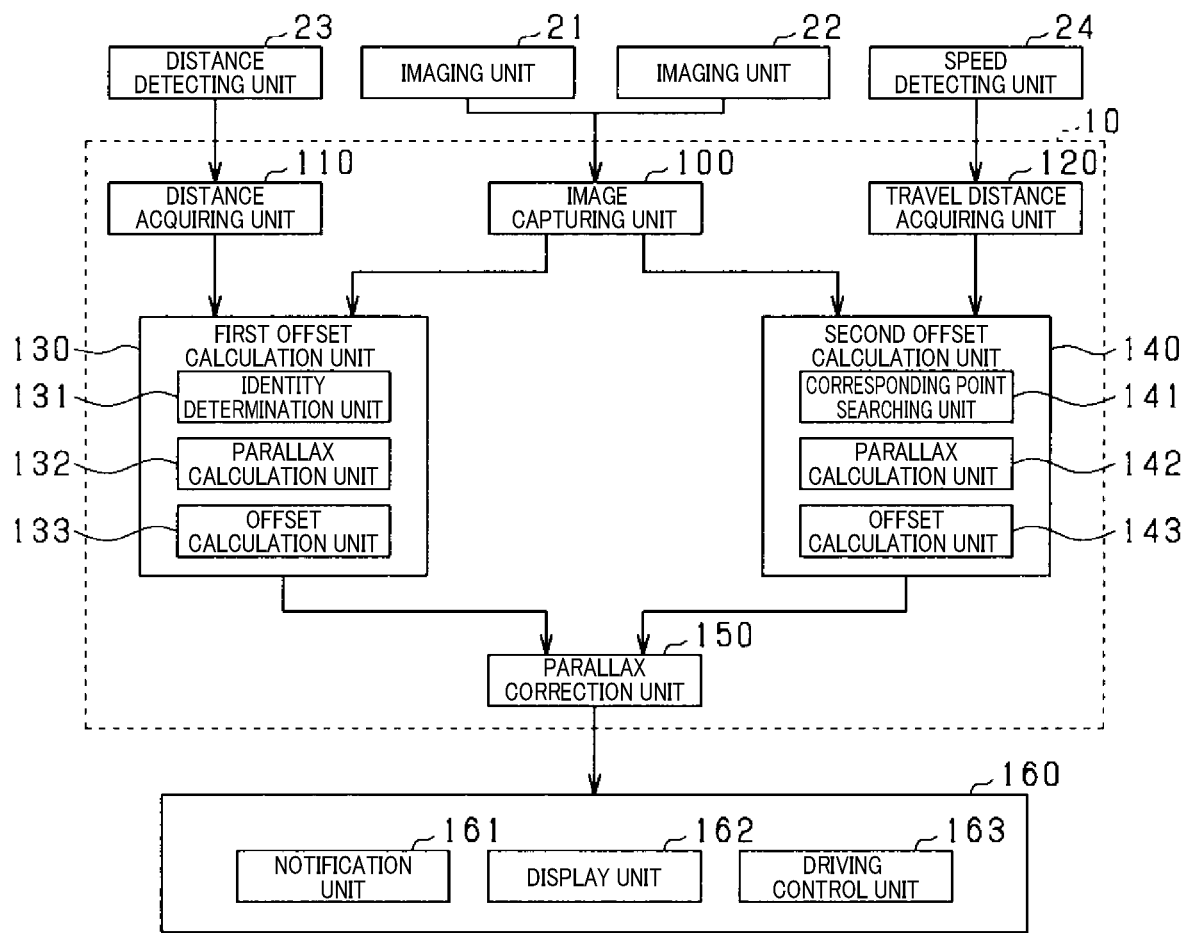
FIG. 1 is a block diagram showing a vicinity supervising device according to an embodiment of the present disclosure.

As shown in FIG. 1, a vicinity supervising device 10 according to the present embodiment includes an image capturing unit 100, a distance acquiring unit 110, a travel distance acquiring unit 120, a first offset calculation unit 130, a second offset calculation unit 140 and a parallax correction unit 150. The vicinity supervising device 10 is configured as an electronic control unit (ECU) including an A/D (analog to digital) converter, I/O, CPU, RAM, ROM, image memory and the like, in which the CPU executes a program stored in advance to accomplish the above-mentioned respective functions. Instead of using the CPU, or together with the CPU, FPGA (field-programmable gate array) where a digital circuit is provided therein may be included.

Signals outputted by imaging devices 21 and 22, a distance detecting unit 23 and a speed detecting unit 24 are converted to digital signals and outputted to the CPU of the vicinity supervising device 10. The vicinity supervising device 10 calculates a parallax offset value based on the input signals to correct the image, and outputs image data and a control signal to an external apparatus 160 including a notification unit 161, a display unit 162 and a drive control unit 163.

An image capturing unit 100 acquires images simultaneously captured by a pair of imaging devices 21 and 22. Thus, a plurality of images can be acquired in which an object is simultaneously captured by the pair of imaging devices 21 and 22 at different locations. The imaging devices 21 and 22 are configured as a stereo camera integrating image sensors such as CCD or COMS sensors or infrared camera. The imaging devices 21 and 22 are mounted to a portion behind the rear-view mirror to have a predetermined base line length in the vehicle width direction. The imaging devices 21 and 22 capture a surrounding environment including a road ahead of the own vehicle and a preceding vehicle or the like.

The imaging device 21 outputs a standard image To and the imaging device 22 outputs a reference image Tc. The imaging device 21 and the imaging device 22 are synchronized to each other, simultaneously capture the surrounding environment at the same timing and output a pair of analog images To and Tc to the image capturing unit 100.

In the image capturing unit 100, the A/D converter converts the pair of analog images To and Tc received from the imaging devices 21 and 22 into digital images each having a predetermined luminance gradation and outputs them to the first offset calculation unit 130 and the second offset calculation unit 140.

The distance acquiring unit 110 acquires a distance up to an object measured by the distance detecting unit 23. The distance detecting unit 23 may be configured of any apparatus that transmits probing waves and receives the reflected waves from an object. Specifically, for example, the distance detecting unit 23 that emits electromagnetic waves (radio waves or light waves) ahead of the vehicle and receives their reflection waves, or a sonar radar apparatus that uses acoustic waves such as ultrasonic waves can be employed. According to the present embodiment, a case will be described in which the distance detecting unit 23 is a laser radar apparatus as an example.

Figure 2:
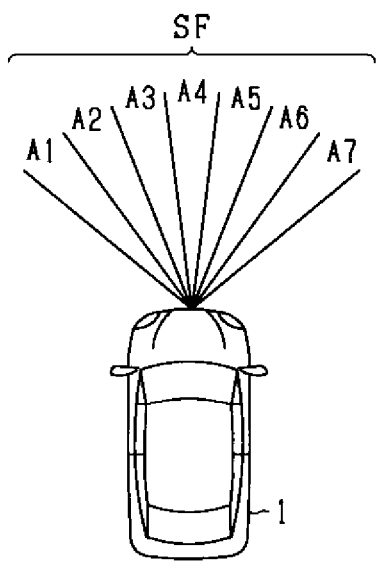
FIG. 2 is a diagram illustrating a probing range of a distance detection apparatus.

As shown in FIG. 2, the distance detecting unit 23 is attached in the vicinity of a front grille of a vehicle 1. The distance detecting unit 23 is provide with a light emitting element such as a laser diode, a collimate lens, a condenser lens, a plurality of light receiving element or the like. Laser light emitted from the light emitting element is radiated towards entire probing range SF by the collimate lens. The incoming reflection light from the probing range SF is received by a plurality of light receiving elements via the condenser lens. As shown in FIG. 2, the plurality of light receiving elements are arranged in the vehicle width direction at a constant interval such that reflected light is received from each of seven divided regions A1 to A7 where the probing range SF is divided at predetermined angle on the horizontal plane. Note that each light receiving range of respective receiving elements in the vertical direction is set to be substantially constant angle range.

The distance detecting unit 23 measures intensity of the reflected light reflected at an object existing ahead of the vehicle 1 for each of the divided regions A1 to A7. The distance detecting unit 23 outputs the measured reflection intensity of the reflection light and a distance Z between the vehicle 1 and the object that causes the reflection light to the parallax offset calculation unit 130.

The first offset calculation unit 130 calculates a first parallax offset value D1 based on a plurality of images received from the image capturing unit 100 and a distance up to the object detected by the distance acquiring unit 110. As shown in FIG. 1, the first offset calculation unit 130 includes an identity determination unit 131, a parallax calculation unit 132 and an offset calculation unit 133.

Figures 3, 4A, 4B:
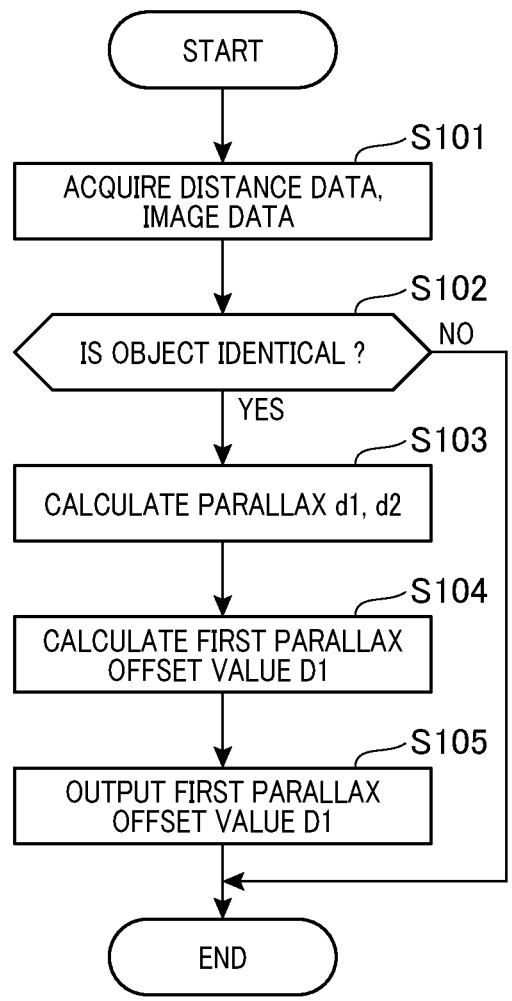
FIG. 3 is a flowchart of a calculation process executed by a first offset calculation unit.
FIG. 4A is a diagram showing positions of pixels in a pixel region of a standard image.
FIG. 4B is a diagram showing positions of pixels in a pixel region of a reference image.

In FIG. 3, a flowchart of a calculation process executed by the vicinity supervising device 10 is shown. This flowchart represents a part of a vicinity supervising method performed by the vicinity supervising device 10. Specifically, the image capturing unit 100 and the distance acquiring unit 110 and the first offset calculation unit 130 executes the calculation process. The image capturing unit 100 and the distance acquiring unit 110 execute an image acquiring step and a distance acquiring step (step S101), to acquire the image data and the distance data, and outputs them to the first offset calculation unit 130. The identity determination unit 131 of the first offset calculation unit 130 executes an identity determination step (step S102) to determine whether the object captured in the image of the image capturing unit 100 and the object from which the distance has been acquired by the distance acquiring unit 110 are identical or not. Specifically, the identity determination unit 131 extracts a data region in which only one object is present in the acquired distance range, and determines whether or not only one object is present in a data region of the image corresponding to the extracted data region, then the identity determination unit 131 determines objects in the both data regions are identical when the only one object is present in a data region of the image corresponding to the extracted data region. When the identification determination unit 131 determines that objects in the both data regions are not identical, the calculation process of the first offset calculation unit 130 is terminated. In other words, the first offset calculation unit 130 calculates a first parallax offset value D1 under a condition where the object captured in the image of the image capturing unit 100 and the object from which the distance has been acquired by the distance acquiring unit 110 are determined as identical.

The parallax calculation unit 132 executes a parallax calculation step (S103) to calculate a parallax value d1 and a parallax value d2 for the object determined as identical by the identity determination unit 131. The parallax value d1 is based on digital image acquired by the image capturing unit 100, and the parallax value d2 is based on the distance acquired by the distance acquiring unit 110.

The parallax value d1 can be calculated by performing a stereo matching process for a pair of digital image. The parallax value d1 is defined as a difference between a position of an object in an image (standard image To) of the imaging device 21 and a position of an object in an image (reference image Tc) of the imaging device 22. The parallax calculation unit 132 divides the standard image To and the s reference image Tc into predetermined pixel regions (e.g., 3×3 pixel block shown in FIG. 4A and FIG. 4B). Then, the parallax calculation unit 132 sets, for each pixel region PBo in the standard image To, an epipolar line EPL corresponding to the pixel region PBo in the reference image Tc, and compares a luminance pattern of the pixel region PBo with a luminance pattern of a pixel region PBc existing on the epipolar line EPL in the reference image Tc. For a comparison between the pixel region PBo and the pixel region PBc, an evaluation function such as SAD (sum of absolute difference) or SSD (sun of squared difference) can be used.

For example, in accordance with a value of SAD expressed in the following equation (1), a sum of absolute value of a difference between a luminance at a position corresponding to the pixel region PBo and a luminance at a position corresponding to the pixel region PBc. Note that Boi in the following equation (1) indicates a luminance at a position i of the pixel region PBo, and Bci indicates a luminance at a position i of the pixel region PBc. Specifically, for example, in the case where the pixel regions PBo and PBc having 3×3 pixels shown in FIG. 4 are used, total sum of absolute differences of SAD is calculated for respective positions i (i=1, 2, . . . , 9) between pixel regions PBo and PBc.

$$SAD=\Sigma_i |Boi-Bck| \tag{1}$$

A pixel region PBc is calculated in which SAD value becomes minimum in the above equation (1), thereby identifying a pixel region PBc in which the same object as captured in the pixel region PBo has been captured. The parallax d1 can be obtained from a positional relationship between pixel region PBo and the pixel region PBc which has captured the same object.

Also, the parallax calculation unit 132 calculates the parallax d2 which is based on the distance acquired by the distance acquiring unit 110. The parallax d2 can be calculated with the following equation (2). In the following equation (2), B represents base line length of the imaging devices 21 and 22, F represents focus distance of the imaging devices 21 and 22, Z represents a distance between the vehicle 1 and the object which are transmitted from the distance acquiring unit 110, Oc represents a distance between the vehicle 1 and the imaging devices 21 and 22. The parallax calculation unit 132 outputs the calculated parallaxes d1 and d2 to the offset calculation unit 133.

$$d2=(B \times F)/(Z+Oc) \tag{2}$$

The offset calculation unit 133 executes a first offset calculation step (step S104) and calculates, based on the following equation (3), a difference between the parallax d1 and the parallax d2 to be the first offset value D1.

The first offset calculation unit 130 outputs the parallax d1 and the first parallax offset value D1 to the parallax correction unit 150 (step S105).

$$D1=d1-d2 \tag{3}$$

The speed detecting unit 24 detects a travelling speed of the vehicle 1 and outputs the detected speed to the travel distance acquiring unit 120. The travel distance acquiring unit 120 multiplies a time course of the received travelling speed and a travelling time to calculates the travelling distance of the vehicle, and outputs the calculated travelling distance to the second offset calculation unit 140. Instead of using the speed detecting unit 24, a travelling distance detecting unit that measures a travelling distance (e.g., a distance measuring unit using GPS (global positioning system)) may be used, and the travel distance acquiring unit 120 may acquire the measured travelling distance by the travelling distance detecting unit.

Figure 5:
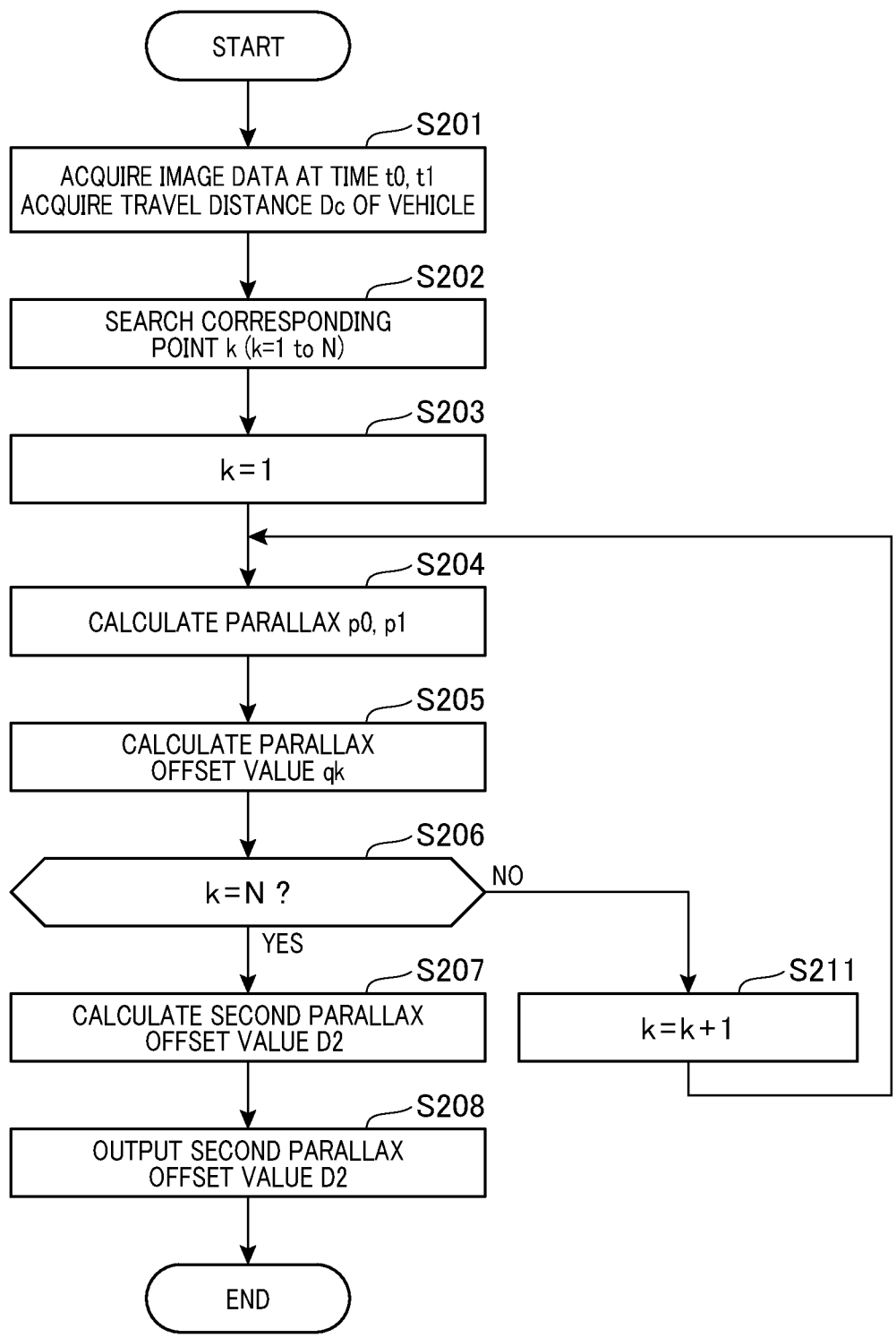
FIG. 5 is flowchart showing a calculation process executed by a second offset calculation unit.

The second offset calculation unit 140 calculates a second parallax offset value based on a change in the parallax in a predetermined period at the identical point among the plurality of images captured by the image capturing unit 100, and a travel distance Dc of the vehicle in a predetermined period. The second offset calculation unit 140 is provided with a corresponding point searching unit 141, a parallax calculation unit 142, and an offset calculation unit 143. In FIG. 5, a flowchart of a calculation process executed by the vicinity supervising device 10 is shown. This flowchart represents a part of a vicinity supervising method performed by the vicinity supervising device 10. Specifically, the image capturing unit 100, the travel distance acquiring unit 120, and the second offset calculation unit 140 executes the calculation process. The corresponding point searching unit 141 first acquires two images of the imaging devices 21 and 22 at a time t0, and a time t1 after elapsing a predetermined time from the time t1, that is, acquires four images (step S201). Further, at the same time, the offset calculation unit 143 acquires, from the travel distance acquiring unit 120, the travel distance Dc of the vehicle 1 for a period from a time t0 to a time t1 (step S201).

Next, the corresponding point searching unit 141 executes a corresponding point searching for the images of the imaging devices 21 and 22 at the time t0, and generates a parallax image. Specifically, the corresponding point searching unit 141 analyzes the images of the imaging devices 21 and 22, and determines a corresponding point which is common between two images. The corresponding point searching unit 141 allocates a mesh in each of the standard image To and the reference image Tc, and searches a corresponding point (mesh) in the left-right images. The searching process of corresponding point in the left-right images can be accomplished using luminance, hue and color distribution or the like. Note that N number of corresponding points are searched (step S202). Hereinafter, the N number of corresponding points are referred to as corresponding point k (k=1-N). Similarly, the corresponding point searching unit 141 executes a corresponding point search for the images of the imaging device 21 and 22 at the time t1 and generates a parallax image.

The corresponding point searching unit 141 outputs the parallax image at the time t0 and the time t1 and the captured image used when calculating the parallax, to the parallax calculating unit 142 and the offset calculating unit 143. For an image used for corresponding point searching, images of the imaging devices 21 and 22 at different time points, i.e., time t0 and time t1 are present. In this regard, the corresponding point searching may be performed for images of either one imaging device, or may be performed for images of both imaging devices. For the corresponding point searching, publicly known techniques such as SAD (sum of absolute difference) or POC (phase only correlation) can be used. Note that the difference between the time t0 and time t1 is preferably set to be in a range such that corresponding points are not present around the edge of images at time t0 and t1. In other words, the time difference is set such that searching failure will not occur.

Figure 6A:
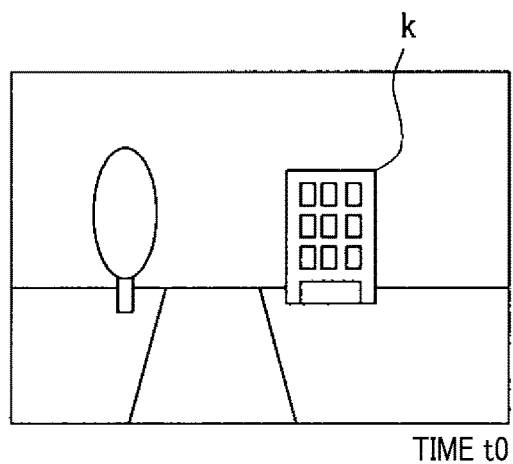
FIG. 6A is an explanatory diagram showing a corresponding point of an image at time t0.
Figure 6B:
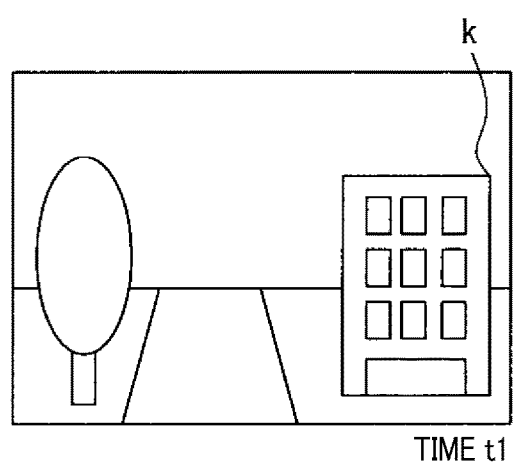
FIG. 6B is an explanatory diagram showing a corresponding point of an image at time t1.

FIGS. 6A and 6B exemplify a corresponding point in the captured image at time t0 and time t1. In FIGS. 6A and 6B, a road, a tree and a building existing ahead of the vehicle are captured in the image, in which a corresponding point k is set at the corner of the building. When time elapses from t0 to t1, a positional change of the object has occurred in accordance with a travel distance of the vehicle. Also, in response to this positional change, the parallax at the corresponding point k also changes. The parallax at the corresponding point k and the distance between the vehicle and the corresponding point k can be calculated with an equation similar to the above-described equation (2), In other words, in the above-described equation (2), parallax value at the corresponding point k substitutes for d2 to obtain Z, whereby the distance between the vehicle and the corresponding point k can be calculated.

The parallax calculation unit 142 calculates parallax p0 and p1 for the corresponding point k which are common among four images acquired by the imaging devices 21 and 22, and outputs the calculated parallaxes to the offset calculation unit 143 (step S204). Note that p0 refers to a parallax at the corresponding point k at time t0 and p1 refers to a parallax of the identical corresponding point k (k=1 to N) at time t1.

The offset calculation unit 143 accepts the travel distance Dc of the vehicle from a time t0 to a time t1, a parallax image, a captured image, parallaxes p0 and p1 for the corresponding point k. The offset calculation unit 143 executes a second offset calculation step (step S203 to step S207 and step S211), calculates qk value for all corresponding points sequentially from k=1 to k=N and calculates a second parallax offset value D2. The offset calculation unit 143 calculates the parallax offset value qk based on the distances Z0 and Z2 which are distance up to the corresponding point k at time t0 and time t1, the parallaxes p0 and p1 at respective time t0 and time t1 (step S205).

The equation to calculate the parallax offset value qk can be derived in the following procedure. First, the distances Z1 and Z1 is expressed with the following equations (4) and (5) using the distances Z1 and Z1, the parallaxes p0 and p1 and the parallax offset value qk. Note that B represents the base line lengths of the imaging devices 21 and 22, F represents the focus distance of the imaging devices 21 and 22.

$$Z0 = (B \times F)/(p0 - qk) \quad (4)$$

$$Z1 = (B \times F)/(p1 - qk) \quad (5)$$

Figure 7:
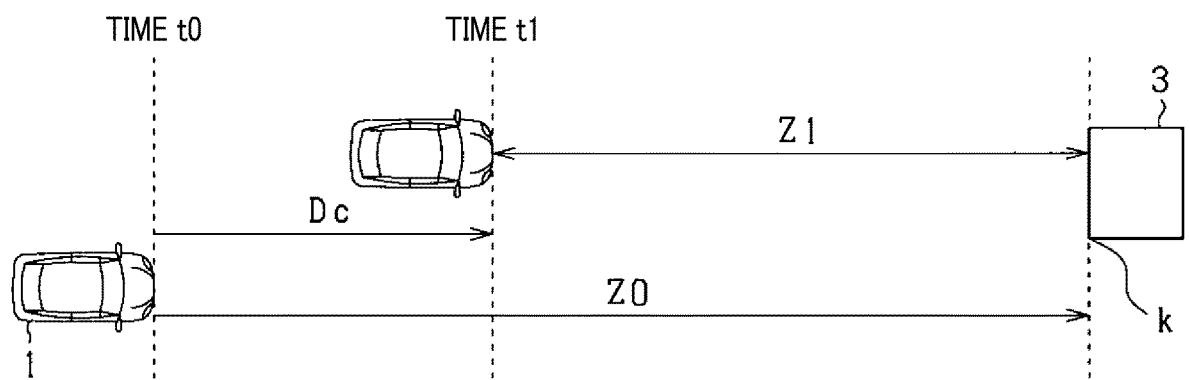
FIG. 7 is an explanatory diagram showing a travel distance and a change in a parallax.

As shown in FIG. 7, a difference between the distance Z0 from the vehicle 1 to the corresponding point k of the object 3 at time t0 and a distance Z1 from the vehicle 1 to the corresponding point k at time t1 corresponds to the travel distance Dc where the vehicle 1 travels from the time t0 to the time t1. In other words, since the travel distance Dc of the vehicle 1 is given with an equation Dc=Z0−Z1, the following equation (6) can be obtained from the above-described equation (4). The following equation (6) can be modified to a quadratic equation of qk so that value of qk can be calculated as shown in the following equation (7) by obtaining the solution of the quadratic equation.

$$Dc = Z0 - Z1 = (B \times F)/(p0 - qk) - (B \times F)/(p1 - qk) \quad (6)$$

$$qk = \frac{(p0 + p1) \pm \sqrt{(p0 + p1)^2 - 4\left\{p0p1 - \frac{B \cdot F}{Dc}(p0 - p1)\right\}}}{2} \quad (7)$$

Processes of steps S204 to S206 where k reaches N and step S211 are repeatedly executed, whereby qk values of all corresponding points are calculated. Specifically, the offset calculation unit 143 determines whether or not k value reaches N (step S206), and updates k value (i.e., k=k+1) (step S211), when the k=N is not satisfied. Then, the offset calculation unit 143 requires the parallax calculation unit 142 to calculate the parallax for the updated corresponding points k. When k=N is satisfied, a statistical process is performed using N of the qk values to calculate the second parallax value D2 and the calculated second parallax value to the parallax correction unit 150 (steps S207 and S208). The statistical process can be performed with regression analysis using normal distribution, polynomial distribution, binomial distribution, Poisson distribution or the like.

Figure 8:
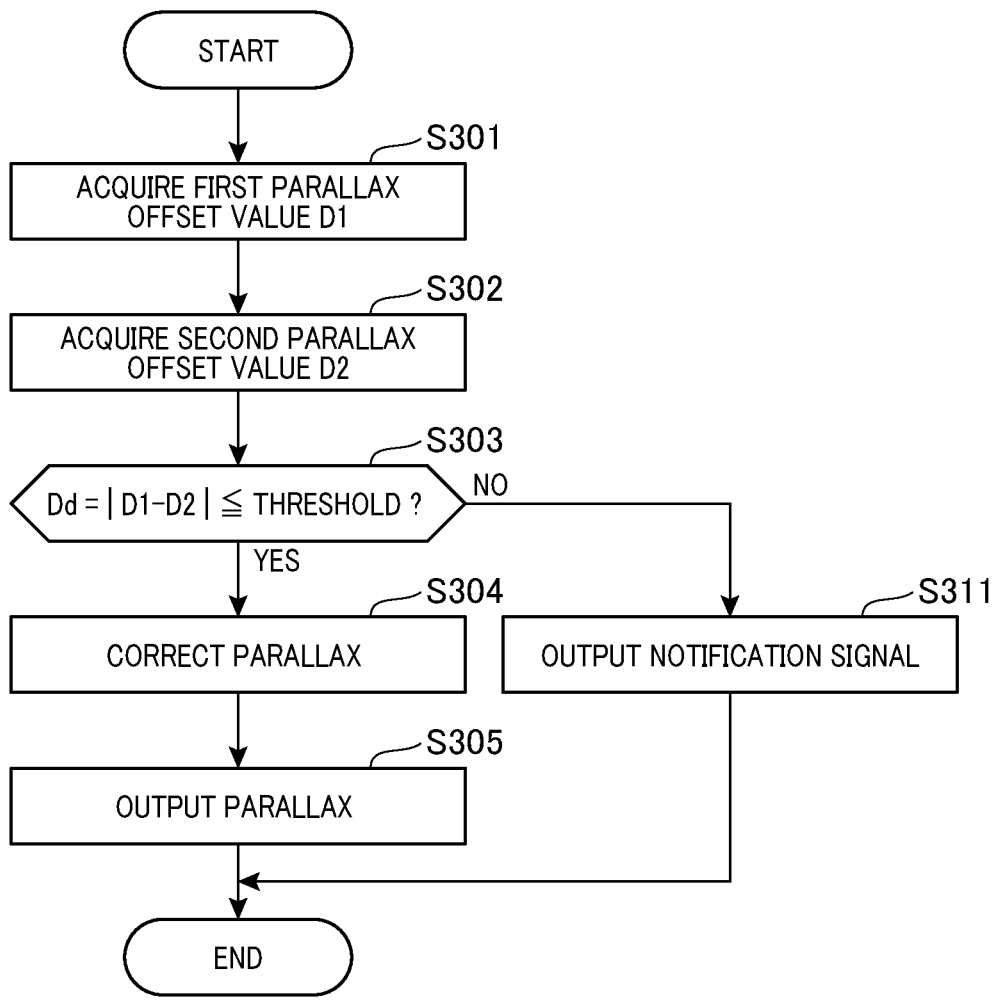
FIG. 8 is a flowchart showing a calculation process of a parallax correction point.

The parallax correction unit 150 corrects the parallax d1 using the first parallax offset value D1 under a condition where a difference between the first parallax offset D1 and the second parallax offset D2 is less than or equal to a threshold. FIG. 8 illustrates a calculation process executed by the parallax correction unit 150 which constitutes a part of a vicinity supervising method performed by the vicinity supervising device 10. The parallax correction unit 150 executes a parallax correction step (S301 to S303), acquires the first parallax offset value D1 and the second parallax offset value D2, and determines whether or not the difference between two parallax offset values D1 and D2 is less than or equal to the threshold X1. The two parallax offset values D1 and D2 differ in their calculation methods, but both values are calculated based on the same image obtained by the imaging devices 21 and 22 so that the difference Dd between them is not so large. Accordingly, if the difference Dd is large, it is considered that malfunction or failure of the distance detecting unit 23 may have occurred. The difference Dd is defined as the following equation (8).

$$Dd = |D1 - D2| \quad (8)$$

When a condition Dd<=X1 is met, the parallax correction unit 150 corrects the parallax d1 using the first parallax offset value D1 (step S304), and outputs the corrected parallax dc to the drive control unit 163 (step S305). The drive control unit 163 performs a vehicle control such as driving assist or the like using the corrected parallax dc. When a condition Dd>X1 is met, the parallax correction unit 150 outputs a signal to the notification unit 161 so as to notify the notification unit of an occurrence of abnormality in the vicinity supervising unit 10 (step S311).

According to the above-described embodiment, the following effects and advantages can be obtained.

The vicinity supervising device 10 calculates the first parallax offset D1 based on the distance measured by using probing waves, and corrects the parallax d1 using the first parallax offset value D1 under a condition where the difference between the first parallax offset value D1 and the second parallax offset value D2 is less than or equal to a threshold. Hence, the parallax correction can be prevented from using the first parallax offset value including errors caused by detection error of the distance. As a result, a vicinity supervising device having high parallax correction accuracy and minimizing malfunction or failure can be provided.

Since the vicinity supervising device 10 corrects parallax using the first offset value D1 calculated based on the distance measured with probing waves, accurate parallax correction can be accomplished.

The vicinity supervising device 10 is provided with an identity determination unit 131 that determines whether or not an object captured in a plurality of images and an object from which the distance is obtained are identical. When the identity determination unit 131 determines that the objects are identical, the first offset calculation unit 130 calculates the first parallax offset value D1. The identity determination unit 131 performs the above-described determination, whereby a reliability of the first parallax offset value can be improved. The vicinity supervising device 10 outputs a signal notifying an abnormality to the notification unit 161 when the difference Dd between the first parallax offset D1 and the second parallax offset D2 is neither equal to nor less than a threshold (i.e. is larger than a threshold) so that the notification unit 161 can be notified of an abnormality of the vicinity supervising device 10. When the difference Ds is large, the distance detecting unit 23 may be suffered from a malfunction or a failure. In other words, the difference Ds is evaluated with a threshold, whereby an abnormality of the distance detection unit 23 or the like can be detected.

According to the above-described embodiment, a vicinity supervising device is exemplified with measurement apparatuses such as a distance detection unit, imaging devices and a speed detecting unit, without including a notification unit, a display unit, a driving control apparatus. However, it is not limited thereto. The vicinity supervising device may include the above-mentioned units or apparatuses, or may integrate them.

What is claimed is:

1. A vicinity supervising device of a vehicle, the vehicle including imaging units configured to capture images and a distance detecting unit configured to detect distance by transmitting and receiving probing waves, the device comprising:
   an image capturing unit that acquires, using a processor, a plurality of images from the imaging units in which an object is simultaneously captured at different locations;
   a distance acquiring unit that acquires, using the processor, a distance up to the object from the distance detecting unit;
   a first offset calculation unit that calculates, using the processor, a first parallax offset value based on the plurality of images and the distance up to the object; and
   a second offset calculation unit that calculates, using the processor, a second parallax offset value based on a change in a parallax in a predetermined period at an identical point among the plurality of images acquired by the image capturing unit and a travel distance of the vehicle travelling in the predetermined period; and
   a parallax correction unit that corrects, using the processor, the parallax using the first parallax offset value under a condition in which a difference between the first parallax offset value and the second parallax offset value is less than or equal to a threshold, wherein
   the parallax correction unit does not correct the parallax under a condition in which a difference between the first parallax offset value and the second parallax offset value is greater than the threshold.

2. The vicinity supervising device according to claim 1, wherein
   the first offset calculation unit is configured to calculate, using the processor, the first parallax offset value under a condition in which the object captured in the plurality of images and the object from which the distance has been acquired are determined as identical.

3. The vicinity supervising device according to claim 1, wherein
   the parallax correction unit is configured to output using the processor, a signal notifying an abnormality under a condition in which a difference between the first parallax offset and the second parallax offset is neither equal to nor less than a threshold.

4. A method for supervising a vicinity of a vehicle comprising:
   acquiring a plurality of images in which an object is simultaneously captured at different locations;
   acquiring a distance up to the object;
   calculating a first parallax offset value based on the plurality of images and the distance up to the object;
   calculating a second parallax offset value based on a change in a parallax in a predetermined period at an identical point among the plurality of images acquired and a travel distance of the vehicle travelling in for the predetermined period; and
   correcting the parallax using the first parallax offset value under a condition in which a difference between the first parallax offset value and the second parallax offset value is less than or equal to a threshold, wherein
   the parallax is not corrected under a condition in which a difference between the first parallax offset value and the second parallax offset value is greater than the threshold.

5. The vicinity supervising device according to claim 1, wherein the processor comprises a field-programmable gate array.

6. A system for correcting parallax of images captured by a vehicle equipped with imaging units and a distance detecting unit, the imaging units configured to capture images and the distance detecting unit configured to detect distance by transmitting and receiving probing waves, the system comprising:
   a processor;
   a non-transitory computer-readable storage medium; and
   a set of computer-executable instructions stored on the non-transitory computer-readable storage medium that cause the processor to implement:
      acquiring a plurality of images from the imaging units in which an object is simultaneously captured at different locations;
      acquiring a distance up to the object from the distance detecting unit;
      calculating a first parallax offset value based on the plurality of images and the distance up to the object;
      calculating a second parallax offset value based on a change in a parallax in a predetermined period at an identical point among the plurality of images acquired and a travel distance of the vehicle travelling in for the predetermined period; and
      correcting the parallax using the first parallax offset value under a condition in which a difference between the first parallax offset value and the second parallax offset value is less than or equal to a threshold, wherein
      the parallax is not corrected under a condition in which a difference between the first parallax offset value and the second parallax offset value is greater than the threshold.

* * * * *